(12) United States Patent
Chockler et al.

(10) Patent No.: US 8,639,490 B2
(45) Date of Patent: Jan. 28, 2014

(54) CONCRETIZATION OF ABSTRACTED TRACES

(75) Inventors: Hana Chockler, Haifa (IL); Sharon Keidar-Barner, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 12/719,019

(22) Filed: Mar. 8, 2010

(65) Prior Publication Data

US 2011/0218793 A1 Sep. 8, 2011

(51) Int. Cl.
*G06F 13/12* (2006.01)

(52) U.S. Cl.
USPC ........................................... 703/20

(58) Field of Classification Search
CPC .................................. G06F 17/5022
USPC .............. 703/13, 14, 20, 22; 702/108, 123;
716/106, 107; 714/738, 724, 739, 741, 714/742, 735, 736
See application file for complete search history.

(56) References Cited

U.S. PATENT DOCUMENTS

| | | | |
|---|---|---|---|
| 6,975,976 B1 | 12/2005 | Casavant et al. | |
| 7,281,185 B2 * | 10/2007 | Maoz et al. | 714/738 |
| 7,418,680 B2 | 8/2008 | Clarke et al. | |
| 7,752,006 B2 * | 7/2010 | Copty et al. | 702/123 |
| 2005/0198597 A1 * | 9/2005 | Zhu et al. | 716/4 |
| 2008/0059842 A1 * | 3/2008 | Kadkade et al. | 714/42 |
| 2008/0082968 A1 * | 4/2008 | Chang et al. | 717/128 |

OTHER PUBLICATIONS

X. Jiang, S. Mahadevan, Bayesian cross-entropy methodology for optimal design of validation experiments, 2006, vol. 17, No. 7, 1895-1908.*
E.M. Rudnick, "Sequential circuit test generation in a genetic algorithm framework", in the Proceedings of ACM/ IEEE Design Automation Conference , Jun. 1994, p. 698-704.
E.M. Rudnick, "Application of simple genetic algorithms to sequential circuit test generation", in Proceedings of the European Design and Test Conference, Feb. 1994, p. 40-45.
I. Pomeranz, "A Cone-Based Genetic Optimization Procedure for Test Generation and Its Application to n$n$-Detections in Combinational Circuits", in IEEE Transactions on Computers, v.48 n.10, p. 1145-1152, Oct. 1999.
F. Como, "Advanced Techniques for GA-based sequential ATPGs", ED&TC '96, 1996 IEEE, 1 Page.

* cited by examiner

*Primary Examiner* — Kamini S Shah
*Assistant Examiner* — Luke Osborne
(74) *Attorney, Agent, or Firm* — Ziv Glazberg

(57) ABSTRACT

A trace associated with an abstraction of a target device is utilized to guide an execution of the target device to be substantially similar to the trace. An execution of the target device determines a non-deterministic decision based on a probability function. The probability function is configured to increase the likelihood that the execution will be substantially similar to the abstracted trace. Cross-entropy method may be utilized to guide the execution of the target device.

14 Claims, 3 Drawing Sheets

CONCRETIZATION OF ABSTRACTED TRACES

BACKGROUND

The present disclosure relates to model checking techniques, in general, and to abstraction-based model checking techniques in particular.

Computerized devices are an important part of modern life. They control almost every aspect of our life—from writing documents to controlling traffic lights. However, computerized devices are bug-prone, and thus require a verification phase in which the bugs should be discovered. The verification phase is considered one of the most difficult tasks in developing a computerized device. Many developers of computerized devices invest a significant portion, such as 70%, of the development cycle to discover erroneous behaviors of the computerized device, also referred to as a target device. The target device may comprise hardware, software, firmware, a combination thereof and the like.

During the verification phase model checking techniques may be utilized to verify that a property is held by the target device. The device is represented using a model, defining a state of the target device in each cycle, and a next state of the target device based on a current state. The next state may be determined deterministically, based on the current state, such as for example a branch in a program may be taken based on a value of a variable. The next state may be determined non-deterministically, such as for example, determining which task performs next in a multi-tasking program may be a non-deterministic decision. Other non-deterministic scheduling decisions may be present in similar target devices, such as multi-process program, multi-core processor or the like. As another example, a target device may receive an input from its environment. The value of the input may be non-deterministic as in some cases it is not dictated by the current state of the target device.

In some cases, an abstraction-based model checking technique may be utilized. In such techniques, an abstraction of the model is determined and is model checked. In case the model checker verifies the property in respect to the abstraction, the (non-abstracted) model is also verified. However, in case the abstracted model falsifies the property, a counter-example may be determined. The counter-example may originate from behavior defined by the model, and therefore may apply to the model also. In some cases, the counter-example is spurious, meaning: the counter-example has been introduced to the model by the abstraction, and the counter-example does not apply to the model.

BRIEF SUMMARY OF THE INVENTION

One exemplary embodiment of the disclosed subject matter is a computer-implemented method for determining an execution of a target device based on an execution of an abstraction of the target device, the method comprising: receiving the execution of the abstraction of the target device; executing the target device using a processor; the executing the target device comprises performing an at least one non-deterministic decision of the target device based on a probability function; determining a measurement of similarity between the execution of the abstraction and the execution of the target device; in response to the determining the measurement of similarity, modifying the probability function.

Another exemplary embodiment of the disclosed subject matter is a computerized apparatus having a processor, the computerized apparatus comprising: a receiver configured to receive an execution of an abstraction of a target device; a probability module configured to determine at least one non-deterministic decision associated with the target device based on a probability function; an execution module configured to execute the target device, the execution module is configured to utilize the probability module to determine the at least one non-deterministic decision; a similarity estimation module configured to determine a measurement of similarity between the execution of the abstraction and the execution of the target device by the execution module; and a probability function modifier configured to modify the probability function utilized by the probability module based on the measurement of similarity determined by the similarity estimation module.

Yet another exemplary embodiment of the disclosed subject matter is a computer program product comprising: a computer readable medium; a first program instruction for receiving the execution of the abstraction of the target device; a second program instruction for executing the target device using a processor; the second program instruction comprises a third program instruction for performing an at least one non-deterministic decision of the target device based on a probability function; a fourth program instruction for determining a measurement of similarity between the execution of the abstraction and the execution of the target device; a fifth program instruction for modifying the probability function in response to the determining the measurement of similarity; and wherein the first, second, third, fourth and fifth program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
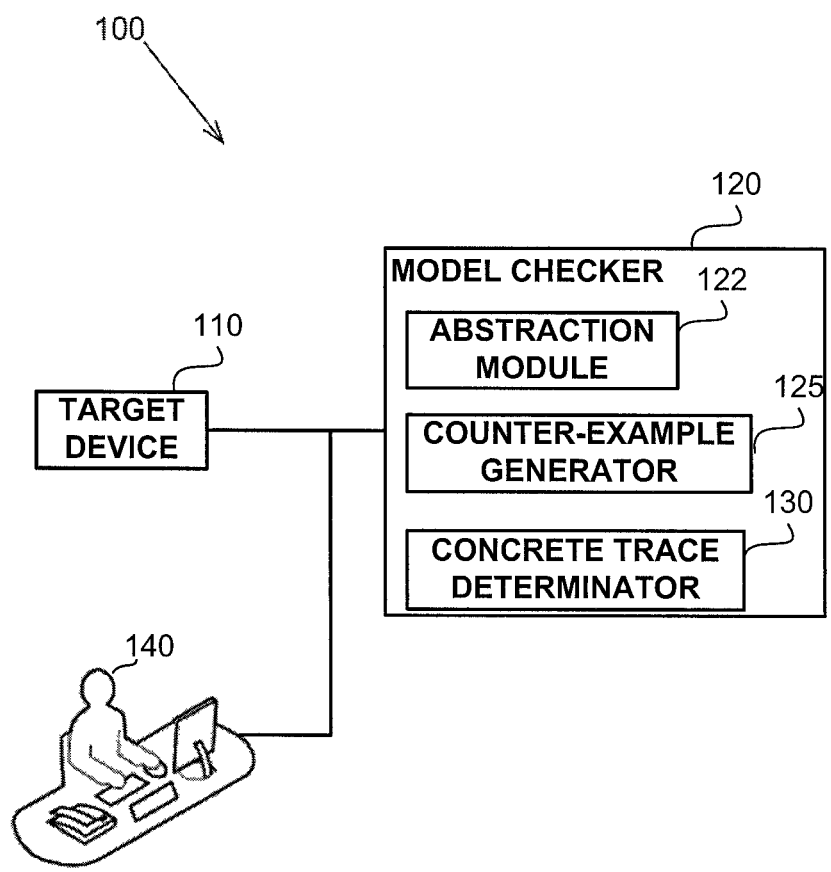
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to determine whether a trace associated with an abstracted model of the target device is a spurious trace. Another technical problem dealt with by the disclosed subject matter is to obtain a concrete trace associated with the trace. Yet another technical problem is enabling abstraction-based model checking.

One technical solution is to execute the target device or a model thereof in such a way that the execution is likely to be similar to the trace. Another technical solution is to utilize cross-entropy methods to direct the execution to be similar to the trace. Yet another technical solution is to determine whether a trace is spurious based on a similarity of an execution. Yet another technical solution is to provide an iterative process of determining an abstracted trace in respect to a predetermined abstraction, determining whether there is a concrete trace associated with the abstracted trace, and in response to a positive determination, halting and providing a falsification.

One technical effect of utilizing the disclosed subject matter is to enable determination of a concrete trace similar to the trace, even though the trace itself is spurious. The concrete trace may not hold a specification property for a similar reason as of the trace, even though the trace itself exhibits a behavior that is not in line with the target device's behavior. Another technical effect of utilizing the disclosed subject matter is enabling a concrete trace determination using relatively limited resources. The disclosed subject matter may be utilized in a non-exhaustive determination of a concrete trace such that a state-space explosion problem that may occur in an exhaustive determination may not occur.

Referring now to FIG. 1 showing a computerized environment in which the disclosed subject matter is used, in accordance with some exemplary embodiments of the subject matter. A computerized environment 100 may comprise a target device 110 and a model checker 120.

In some exemplary embodiments, the target device 110 may be a hardware component, a software component, a communication protocol, a business process or the like. The target device 110 may be associated with a model, such as defined by a descriptive language, such as for example SystemC, Verilog, GDL, Sugar or the like. In some exemplary embodiments, the target device 110 may be operational, in some exemplary embodiments, the target device 110 may be not operational.

In some exemplary embodiments, the model checker 120 may perform model checking in respect to the target device 110. The model checker 120 may determine whether or not a predetermined property, also referred to as a specification property, is held for the target device 110. The model checker 110 may determine whether or not the specification property is held by examining a model of the target device 110.

In some exemplary embodiments, the model checker 120 may comprise an abstraction module 122. The abstraction module 122 may determine an abstraction in respect to a model. Various abstractions may be determined, such as for example localization abstraction. It is noted that the model checker 120 may be able to determine whether a property is held in respect to an abstract model using less resources than required to determine whether the model itself holds the property. In some cases, examining the model is infeasible due to what is known as the "state-space explosion problem". In some exemplary embodiments, the abstraction comprises each behavior of the model and includes additional behaviors. In case the abstract model holds a property, it may be determined that the model also holds the property. In case the abstract model does not hold the property, an examination may be performed to determining whether or not the model does also violate the property.

In some exemplary embodiments, the model checker 120 may be an abstraction-refinement model checker, as is known in the art.

In some exemplary embodiments, the model checker 120 may comprise a counter-example generator 125. The counter-example generator 125 may be configured to determine a counter-example in respect to a violation of a property by a model. The counter-example generator 125 may determine a counter-example, also referred to as a trace, in which the property is not held. The counter-example generator 125 may determine a counter-example in respect to a violation of the property by an abstraction. In some cases, a determination whether or not the trace is relevant to the model as well (i.e., in addition to the abstraction) may be performed. A counter-example of the model that is exhibiting the behavior described in the counter-example of the abstraction may be referred to as a concrete counter-example. A counter-example that is relevant to the abstraction and not to the model is referred to as spurious. A spurious counter-example may comprise a behavior that is not in line with the model and is in line with the abstraction. For such a reason, there may not be a concrete trace in the model in respect to the spurious counter-example.

In some exemplary embodiments, the model checker 120 may comprise a concrete trace determinator 130. The concrete trace determinator 130 may be configured to determine a trace of an execution of the target device 110, a trace in a model of the target device 110, a trace of a simulation of the target device 110 or the like, that is associated with a trace of the abstracted model, also referred to as an abstracted trace. It will be noted that the trace determined by the concrete trace determinator 130 may be a concrete trace of the abstracted trace. In some cases, however, the trace may be similar to the abstracted trace even though the abstracted trace is spurious and exhibits at least one abstracted behavior not in line with the non-abstracted model.

In some exemplary embodiments, a user 140 may utilize the model checker 120. The user 140 may be a Quality Assurance (QA) team member, a verification engineer, a designer or the like. The user 140 may utilize a terminal such as a Personal Computer (PC), a laptop, a Personal Digital Assistant (PDA), a mobile device or the like to interact with the model checker 120. The user 140 may provide the model of the target device 110. The user 140 may provide an abstraction of the target device 110. The user 140 may provide parameters to perform model checking. The user may receive output of the model checker 120, such as for example informing of failing a property, passing a property or the like.

Figure 2:
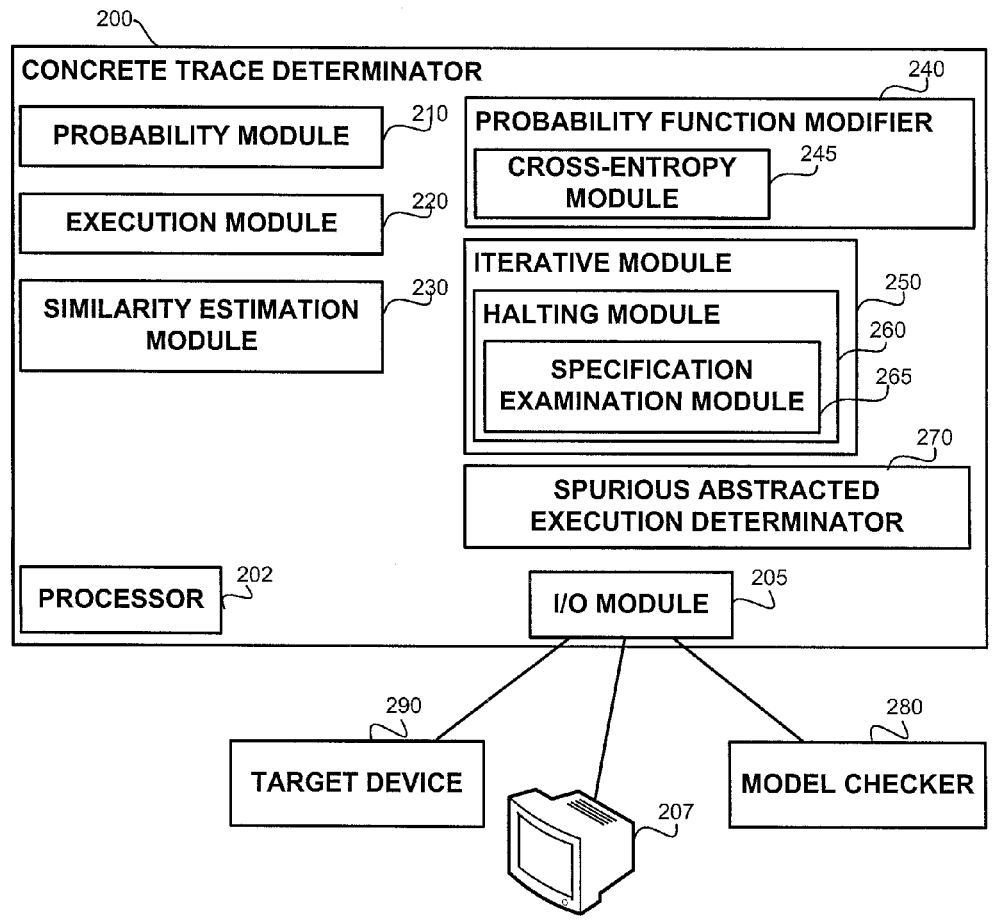
FIG. 2 shows a block diagram of a concrete trace determinator, in accordance with some exemplary embodiments of the disclosed subject matter.

Referring now to FIG. 2 showing a block diagram of a concrete trace determinator, in accordance with some exemplary embodiments of the disclosed subject matter. A concrete trace determinator 200, such as for example 130 of FIG. 1, may be configured to determine a trace associated with a target device 290, such as 110 of FIG. 1, and with an abstracted trace. The concrete trace determinator 200 may determine a concrete trace of the abstracted trace. The concrete trace determinator 200 may determine a concrete trace similar to the abstracted trace.

In some exemplary embodiments, the concrete trace determinator 200 may comprise a probability module 210. The probability module 210 may be configured to determine a non-deterministic decision. The non-deterministic decision may be associated with an execution of the target device 290, a simulation of such execution or the like. The probability module 210 may utilize a probability function to determine a probability of determining each possibility of the possibilities of the non-deterministic decision. In some exemplary embodiments, a non-deterministic decision may be a non-deterministic value of an input, also referred to as non-deterministic input. The input may be received by the target device 290 from an environment. The input may be received from a user, a component of a system integrated with the target device 290, a library function, a function returning random or pseudo-random values, or the like. The input may be non-deterministic from a view point of the target device 290. The input may be a value of a predetermined type, a predetermined range or the like. For example, the input may be a value of an ENUM type. As another example, the input may be a 32-bit value. In some exemplary embodiments, a non-deterministic decision may be a scheduling decision such as performed by a concurrent target device 290. The scheduling decision may select one entity of a set of possible entities to become active and be executed. The entities may be various executable entities such as threads, a processes or the like.

In some exemplary embodiments, an execution module 220 may be configured to execute the target device 290. Execution of the target device 290 may be by actually executing the target device 290, by simulating an execution of the target device 290 or the like. Simulation may be used in case the target device 290 is not available to be executed, such as in case of a circuitry not yet fabricated. Simulation may be used in case executing the target device 290 is not cost-effective. Other reasons may also apply to performing simulation in lieu of actual execution. The execution module 220 may perform simulation in respect to the target device 290 itself, a mode thereof or the like. The execution module 220 may utilize the probability module 210. An execution of the target device 290 may be configured to decide non-deterministic decisions based on the probability function of the probability module 210. In some exemplary embodiments, the execution module 220 may instrument the target device 290 such that a non-deterministic decision may be determined stochastically based on the probability function. In such embodiments, the instrumented target device may be executed. During execution due to the instrumentation, the decisions may be determined based on the probability function. In some exemplary embodiments, the execution module 220 may simulate execution of the target device 290 and determine a non-deterministic decision based on the probability function.

In some exemplary embodiments, a similarity estimation module 230 may be configured to determine a measurement of similarity between a first and second executions. The first execution may be an execution of the abstraction. The second execution may be an execution invoked by the execution module 220. The first and second executions may be traces, logs, descriptive characterization of the execution or the like. A measurement of similarity between two executions may be determined based on various parameters. As one example, similarity may be determined based on a computation of a distance between control graphs of the two executions. As another example, similarity may be determined based on a computation of difference between decisions determined in associated non-deterministic decisions. See also Hana Chockler, Eitan Farchi, Benny Godlin, and Sergey Novikov: Cross-Entropy-Based Replay of Concurrent Programs. FASE 2009: 201-215, which is incorporated by reference herein.

In some exemplary embodiments, a probability function modifier 240 may be configured to modify the probability function of the probability module 210. The probability function modifier 240 may modify the probability function in response to a determination of measurement of similarity by the similarity estimation module 230. In some exemplary embodiments, the probability function may be modified such that it may be more likely that an execution of the target device 290 (or simulation thereof) that utilizes the modified probability function will be similar to a trace than an execution performed using the probability function. Various techniques may be utilized to perform such a modification such as for example cross-entropy method, genetic algorithm, simulated annealing, swarming and the like.

In some exemplary embodiments, a cross-entropy module 245 may be utilized by the probability function modifier 240. The cross-entropy module 245 may be utilized to determine cross-entropy based on the measurement of difference between the abstracted execution and the execution invoked by the execution module 220. The cross-entropy module 245 may be utilized to perform the cross-entropy method, as is known in the art.

In some exemplary embodiments, an iterative module 250 may be configured to perform an iterative process. In some exemplary embodiments, the iterative process is the cross-entropy method. In some exemplary embodiments, the iterative process is an optimization of a target function, where the target function is assigned a highest value when the execution and the abstracted execution are identical. Other iterative processes may be used. The iterative module 250 may initiate iteratively the execution module 220 to provide an execution, invoke the similarity estimation module 230 to determine a measure of similarity between the execution and an abstracted execution. The iterative module 250 may further invoke in an iteration the probability function modifier 240 to modify the probability function that may be used by the execution module 220 in a successive iteration.

In some exemplary embodiments, the iterative module 250 may comprise a halting module 260. The halting module 260 may be configured to determine a halting condition for the iterative process performed by the iterative module 250. The halting module 260 may determine that the execution and the abstracted execution are similar enough, such that the execution is a concrete trace of the abstracted execution. In some exemplary embodiments, the halting module 260 may compare the measurement of similarity to a predetermined range or threshold. In some exemplary embodiments, the halting module 260 may determine that sufficient iterations have been performed, and a concrete trace (or a substantially similar trace) is not likely to be discovered. The halting module 260 may determine that a predetermined number of iterations threshold has been reached, that a predetermined resources amount has been utilized, such as elapsed time of the iterative process.

In some exemplary embodiments, a specification examination module 265 may be utilized to determine whether a concrete trace has been discovered. The specification examination module 265 may be configured to determine whether a specification property is held by the execution invoked by the execution module 220. As disclosed above, in some exemplary embodiments, the abstracted execution is a counter-example of a model checking process in respect to a specification. The execution may be checked in respect to the specification by the specification examination module 265. In case the execution does not hold the specification, the execution is a counter-trace of the target device 290 (as opposed to the abstracted model) exemplifying that the specification is not held by the target device 290. It will be noted that in some embodiments, the abstracted execution may be a spurious counter-example, and a concrete execution may still be discovered in accordance with the disclosed subject matter. The disclosed subject matter may be viewed as directing pseudo-random executions to behave in a similar manner to that of the abstracted execution. Therefore, the executions are likely to violate the specification for a similar reason that the abstracted execution violates the specification.

In some exemplary embodiments, a spurious abstracted execution determinator 270 may be configured to determine that the abstracted execution of the target device 290 is spurious. The spurious abstracted execution determinator 270 may perform such a determination based on a halting determination of he halting module 260, such as for example in case a determination that enough resources has been utilized to try and discover a concrete execution. It will be noted that the spurious abstracted execution determinator 270 may perform an estimation only and may erroneously determine that an abstracted execution is spurious. It will be further noted however that the disclosed subject matter provides a relatively low-resource technique to provide for a relatively reasonable estimation, as opposed to other techniques which require large amounts of resources and may be infeasible due to the state-space explosion problem.

In some exemplary embodiments of the disclosed subject matter, the concrete trace determinator 200 may comprise an Input/Output (I/O) module 205. The I/O module 205 may be utilized to receive, retrieve or otherwise obtain an abstracted trace. The abstracted trace may be obtained from a model checker 280. The I/O module 205 may provide an output to the model checker 280, such as indicating a spurious counter-example, providing a concrete trace or the like. The I/O module 205 may provide an interface to the target device 290, a simulator (not shown) to simulate execution of the target device 290 or the like. The I/O module 205 may enable providing output to a user (not shown) via an output device 207 such as a terminal, a printer, a file or the like. The I/O module 205 may comprise a communication interface, a keyboard, a pointing device, a file system interface, an Application Programming Interface (API), a socket, a terminal or the like.

In some exemplary embodiments, the concrete trace determinator 200 may comprise a processor 202. The processor 202 may be a Central Processing Unit (CPU), a microprocessor, an electronic circuit, an Integrated Circuit (IC) or the like. The processor 202 may be utilized to perform computations required by the concrete trace determinator 200 or any of it subcomponents.

Figure 3:
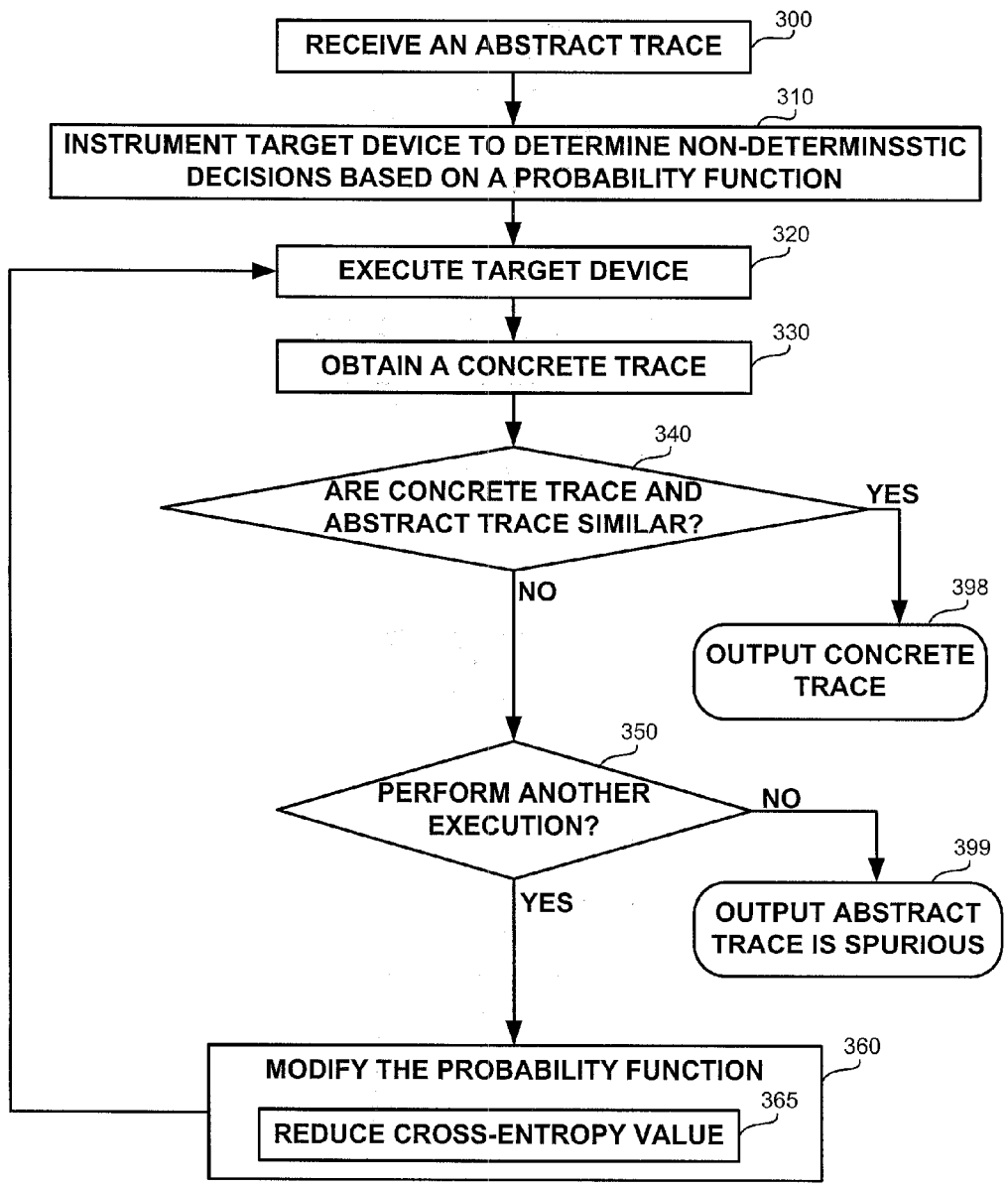
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter. The method of FIG. 3 may be performed by a concrete trace determinator, such as 200 of FIG. 2.

In step 300, an abstract trace may be received. The abstract trace may be received by an I/O module, such as 205 of FIG. 2. The abstract trace may be determined by a model checker, such as 120 of FIG. 1.

In step 310, the target device, such as 110 of FIG. 1, may be instrumented. The instrumentation may modify the target device such that the non-deterministic decisions may be determined based on the probability function, as is known in the art. It will be noted that in some exemplary embodiments, each non-deterministic decision may be associated with a different probability function. The instrumentation may be performed by an execution module, such as 220 of FIG. 2. In some exemplary embodiments, instrumentation may be avoided and other methods may be used to affect the behavior of the target device in a similar manner. For example, instrumentation may be avoided in case a simulation is used and the simulator may be configured to override non-deterministic decisions to be performed in accordance with probability functions.

In step 320, the target device may be executed. The target device may be executed by the execution module 220. The target device may be executed such that the non-deterministic decisions may be determined based on the probability function. For example, the instrumented target device of step 310 may be executed.

In step 330, a concrete trace may be obtained. The concrete trace may be obtained from the execution of step 320, such as for example using a log file, the execution module or the like. The concrete trace may be obtained by the concrete trace determinator 200.

In step 340 a determination whether or not the concrete trace of step 330 and the abstract trace of step 300 similar is performed. The determination may be based on a predetermined range of similarity measurement. The determination may be made based on the measurement of similarity determined by a similarity estimation module, such as 230 of FIG. 2. In case the traces are similar enough, the concrete trace may be outputted in step 398. In some exemplary embodiments, an indication of the existence of the concrete trace may be outputted instead or in addition.

In some other exemplary embodiments, in step 340 a determination whether or not the specification is held by the concrete trace may be determined. The determination may be performed by a specification examination module, such as 265 of FIG. 2. In some exemplary embodiments, a combination of the aforementioned determinations may be performed.

In case step 340 does not indicate that a concrete trace has been encountered, step 350 may be performed. In step 350 a determination whether or not another iteration of an iterative process comprising steps 320-340 should be performed. The determination may be performed by a halting module, such as 260 of FIG. 2.

In case another iteration is not to be performed, step 399 may be performed and an output may be provided. The output may indicate that the abstract trace is spurious.

In case another iteration is to be performed, step 360 may be performed. In step 360 the probability function utilized in executing the target device in step 320 may be modified. The modification may be performed by a probability function modifier, such as 240 of FIG. 2. In some exemplary embodiments, modification of the probability function may have effect only by re-instrumenting the target device. In other exemplary embodiments, the instrumentation may utilize an external interface to the probability function and therefore may not require re-instrumentation. In some exemplary embodiments, modification of the target device in step 310 provides an infrastructure to utilize a probability function that may be modified in step 360.

In some exemplary embodiments, step 306 may comprise step 365. In step 365 a reduction to the cross entropy value is performed. The cross-entropy value may be determined by a cross-entropy module, such as 245 of FIG. 2. The probability function may be modified to reduce the cross-entropy value by the cross-entropy module.

In some exemplary embodiments, the method of FIG. 3 is utilized by an abstraction-based model checker. The abstraction-based model checker may refine the abstraction based on a spurious counter-example in an iterative manner. In other exemplary embodiments, the abstraction-based model checker may provide a different counter-example that is different than the abstract trace provided in step 300.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving an abstract trace of an execution of an abstraction of a target device, the abstract trace may or may not be feasible in the target device;
   utilizing a cross-entropy method to guide executions of the target device to correlate with the abstract trace, wherein said guiding executions is performed by a computer, wherein said guiding executions comprises:

repeatedly generating a random concrete trace using a probability function and updating the probability function to reduce cross-entropy with relation to a next randomly generated concrete trace and the abstract trace, wherein said repeatedly generating and updating is performed until a measurement of similarity between the randomly generated concrete trace and the abstract trace is within a predetermined range or until a halting condition is met, wherein the probability function is used to determine a non-deterministic decision of the target device, wherein said updating is configured to bias, but does not guarantee, generation of the next randomly generated concrete trace to be different than the random concrete trace.

2. The method of claim 1, wherein said receiving the abstract trace comprises:
model checking the abstraction of the target device, said model checking comprises determining a counter-example;
wherein the counter-example is the abstract trace; and
wherein said guiding executions is used to estimate whether the counter-example is a spurious counter example that is not feasible in the target device.

3. The method of claim 2 further comprises determining whether the counter-example is spurious based on the measurement of similarity.

4. The method of claim 3 further comprises
in response to a determination that the counter-example is spurious, model checking a modification of the abstraction of the target device, the modification of the abstraction of the target device excludes the counter-example.

5. The method of claim 1, wherein the target device is a computer program.

6. The method of claim 5, wherein the at least one non-deterministic decision is selected from the group consisting of a scheduling decision and a decision on non-deterministic input.

7. The method of claim 1, wherein the target device is a hardware component.

8. The method of claim 7, wherein the at least one non-deterministic decision is a decision on non-deterministic input.

9. The method of claim 1, wherein the measurement of similarity is determined by determining a value of a performance function, the value of the performance function is indicative to the measurement of similarity between the execution of the abstraction and the execution of the target device.

10. An apparatus having a processor, the processor being adapted to perform the steps of:
receiving an abstract trace of an execution of an abstraction of a target device, the abstract trace may or may not be feasible in the target device;
utilizing a cross-entropy method to guide executions of the target device to correlate with the abstract trace, wherein said guiding executions comprises:
repeatedly generating a random concrete trace using a probability function and updating the probability function to reduce cross-entropy with relation to a next randomly generated concrete trace and the abstract trace, wherein said repeatedly generating and updating is performed until a measurement of similarity between the randomly generated concrete trace and the abstract trace is within a predetermined range or until a halting condition is met, wherein the probability function is used to determine a non-deterministic decision of the target device, wherein said updating is configured to bias, but does not guarantee, generation of the next randomly generated concrete trace to be different than the random concrete trace.

11. The apparatus of claim 10, wherein said receiving the abstract trace comprises:
model checking the abstraction of the target device, said model checking comprises determining a counter-example;
wherein the counter-example is the abstract trace; and
wherein said guiding executions is used to estimate whether the counter-example is a spurious counter example that is not feasible in the target device.

12. The apparatus of claim 11, wherein the processor is further adapted to perform: determining whether the counter-example is spurious based on the measurement of similarity.

13. The apparatus of claim 12, wherein the processor is further adapted to perform:
in response to a determination that the counter-example is spurious, model checking a modification of the abstraction of the target device, the modification of the abstraction of the target device excludes the counter-example.

14. A computer program product comprising a non-transitory computer readable medium retaining program instructions, which instructions when read by a processor, cause the processor to perform a method comprising:
receiving an abstract trace of an execution of an abstraction of a target device, the abstract trace may or may not be feasible in the target device;
utilizing a cross-entropy method to guide executions of the target device to correlate with the abstract trace, wherein said guiding executions comprises:
repeatedly generating a random concrete trace using a probability function and updating the probability function to reduce cross-entropy with relation to a next randomly generated concrete trace and the abstract trace, wherein said repeatedly generating and updating is performed until a measurement of similarity between the randomly generated concrete trace and the abstract trace is within a predetermined range or until a halting condition is met, wherein the probability function is used to determine a non-deterministic decision of the target device, wherein said updating is configured to bias, but does not guarantee, generation of the next randomly generated concrete trace to be different than the random concrete trace.

* * * * *